United States Patent [19]

Clark, III

[11] 4,334,322

[45] Jun. 8, 1982

[54] COMMUNICATION MANAGEMENT SYSTEM FOR PROVIDING ANTIJAM/PRIVACY CAPABILITIES FOR VOICE RADIO COMMUNICATIONS

[75] Inventor: Egbert B. Clark, III, Alexandria, Va.

[73] Assignee: E-Systems, Inc., Dallas, Tex.

[21] Appl. No.: 88,523

[22] Filed: Oct. 26, 1979

[51] Int. Cl.$^3$ ........................ H04B 17/00; H04B 3/46

[52] U.S. Cl. ........................................... 455/62; 455/1; 455/4; 455/26

[58] Field of Search ........................ 455/1, 3, 4, 26, 29, 455/62, 53, 51, 52, 135, 136, 179, 219, 257, 295, 67; 375/1, 25

[56] References Cited

U.S. PATENT DOCUMENTS

| | | | |
|---|---|---|---|
| 3,160,813 | 12/1964 | Biggi | 455/62 |
| 3,475,685 | 10/1969 | Covill | 455/62 |
| 3,588,731 | 6/1971 | Hoeffer . | |
| 3,750,163 | 7/1973 | Hecker . | |
| 3,949,397 | 4/1976 | Wagner . | |
| 4,146,839 | 3/1979 | Troy | 455/62 |
| 4,197,500 | 8/1980 | Klein | 455/62 |

*Primary Examiner*—Tommy P. Chin

*Attorney, Agent, or Firm*—Robert V. Wilder; Albert M. Crowder, Jr.

[57] ABSTRACT

A communications management system includes a central processor (10) which is connected via an order wire subsystem (12) to various remote terminals (14, 16, 18). The central processor (10) maintains tables (42, 44) which relate remote terminals (14, 16, 18) to communication operating frequencies and assign jammers to selected operating frequencies. Further tables are maintained to list adversary frequencies (40), remote terminal locations (46) and remote terminal channel monitor assignments (48). Processor (10) develops the communications assignment table based on a preselected set of operating channels minus the channels being jammed or used by adversary parties. The channel assignments are changed on a recurring basis to reduce the probability of intercept and jamming. An operator console (24) is provided for displaying the data in the tables and for entering commands to update the tables. An external sensor system (22) is utilized for monitoring communication channel activity to update the adversary frequencies table (40). The remote terminals comprise tactical radios (66) connected by an interface module (78) to the order wire subsystem (12). Interface modules (78) are adapted to accommodate the many designs of radios (66) now in military inventories.

27 Claims, 2 Drawing Figures

COMMUNICATION MANAGEMENT SYSTEM FOR PROVIDING ANTIJAM/PRIVACY CAPABILITIES FOR VOICE RADIO COMMUNICATIONS

TECHNICAL FIELD

The present invention pertains to radio communications, and in particular to a distributed terminal communication network which can operate on a plurality of radio frequency channels.

BACKGROUND ART

In the U.S. armed forces and those of many other countries tactical voice communications currently are carried out with VHF (Very High Frequency) FM radios which do not include any provision for anti-jam protection, privacy, prevention from intercept or frequency management. The technology of electronic warfare is rapidly advancing and the possibility that a hostile party will utilize active jamming and passive intercept is becoming more likely. It is clear that tactical radio communications must be adapted to cope with developing electronic warfare threats.

A great number of tactical radios are now in the inventories of the military services of the United States and other countries. It is not practical to phase out the existing radios and totally replace them with advanced radio systems having anti-jam and privacy protection features. Further, such a total replacement of existing radios would be prohibitively expensive.

An effective approach for reducing electronic warfare threats, and one which is compatible with the design of many existing radios, is to change the radio frequency operating channels on the most rapid basis possible. This reduces the probability that the communication channel being used will be either jammed or subject to intercept. The current practice is to plan frequency allocation in advance then print and distribute the radio frequency assignments for upcoming time periods. However, this type of system generally has a frequency change only on a daily, or less frequent basis. This provides little protection from intercept or jamming. But merely increasing the rate of frequency changes using the preplanning technique would generally not be effective because more frequent channel changes would consume excessive operator time and the distribution and control of the printed matter describing the allocated frequency channels would be a cumbersome process subject to security breaches.

Therefore, there exists a need for an apparatus and method to operate conventional tactical radios in such a manner as to provide changes in frequency channels at a rate to reduce the probability of jamming or intercept while at the same time eliminating the operator burden of radio tuning and the problem of distributing frequency channel schedules.

DISCLOSURE OF THE INVENTION

Communication management apparatus is provided for assigning radio frequency communication channels to a plurality of communications terminals wherein each terminal is either a tactical communication terminal or a radio frequency jammer. The apparatus includes a central processor for maintaining a communication assignment table which relates each of the terminals to a selected channel. An "order wire" communication subsystem connects the central processor to each of the terminals and conveys channel assignment commands from the central processor to the terminals. The "order wire" subsystem is independent of and uses a separate radio frequency from the communication channels used by the terminals. Commands are generated within the central processor in accordance with the communication assignment table and the commands are conveyed through the "order wire" system and delivered to the communication terminals and jammers. The central processor revises the communication assignment table on a recurring basis to change the channel assignments for the communication terminals. The communication terminals are commanded to operate on the frequencies defined in the communication assignment table and the table is revised on a sufficiently frequent basis to reduce the probability of intercept and jamming.

In a further embodiment of the invention communication channels are monitored by external sensors to detect activity by adversary parties. The activity of adverse parties is maintained in a table and the jammers under control of the central processor are commanded to generate jamming signals on the adversary frequencies.

In a still further embodiment the communication terminals are commanded to monitor the communication channels and report any activity thereon back to the central processor for updating the activity on the communication channels.

BRIEF DESCRIPTION OF THE DRAWINGS

For a more complete understanding of the present invention and the advantages thereof, reference is now made to the following description taken in conjunction with the accompanying drawings in which.

DETAILED DESCRIPTION OF THE INVENTION

Figure 1:
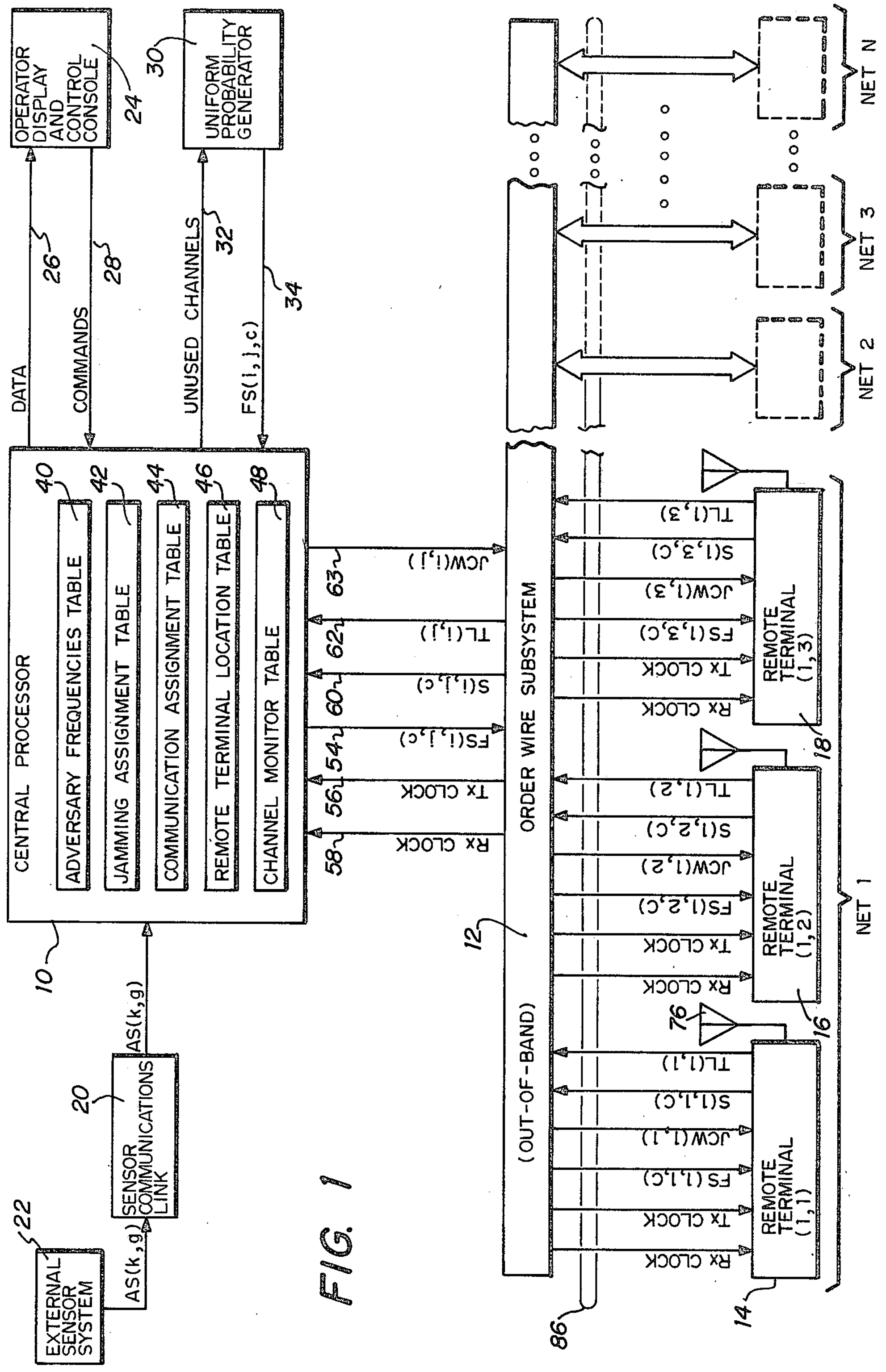
FIG. 1 is a block diagram of the hybrid radio communication system of the present invention.

A communications network which operates in accordance with the present invention is shown in FIG. 1. A central processor 10 comprises a microprocessor system which is, for example a model 8080, manufactured by the Intel Corporation. Processor 10 includes a memory for the storage of various tables described below. Central processor 10 is connected by an order wire subsystem 12 to each of a plurality of remote terminals including 14, 16 and 18. Central processor 10 is also connected through a sensor communications link 20 to receive information from an external sensor system 22.

An operator display and control console 24 is connected to central processor 10 wherein console 24 receives data from the central processor 10 via line 26 for display and transmits operator generated operational commands via line 28 to the processor.

A pseudo-random number generator 30 is connected by lines 32 and 34 to processor 10. The information conveyed over lines 32 and 34 between pseudo-random number generator 30 and processor 10 will be described below in conjunction with the operation of the central processor 10.

Remote terminals 14, 16 and 18, which can be either communication terminals or radio frequency jammers, are collected together to comprise net 1. Other remote terminals are collected together to form additional nets 2, 3 and continuing through net n. In general, one communication channel is assigned to one net and all of the terminals in the net operate on the same assigned channel.

A number of information tables are maintained in the memory of processor 10. An adversary frequencies table 40 is a listing of radio frequency channels on which adversary parties are operating together with entries defining the geographical locations at which each of the adversary radio frequency channels is being operated. A jamming assignment table 42 is maintained wherein communication channels are assigned to each of the remote jammers for operating on the assigned channel. A communication assignment table 44 is maintained to define the communication channel on which each of the remote terminals is designated to operate. A remote terminal location table 46 lists the geographical location for each of the remote terminals. Last, a channel monitor table 48 is maintained by processor 10 for designating which of the remote channels is being operated in a receive mode to monitor selected communication channels for activity.

A number of command and monitor signals are utilized by processor 10 and the terminology describing these signals is shown in summary form in table 1. Each remote terminal within a net carries the designation j while the particular net is designated by i. Thus each terminal is identified by the terms i, j. Time information indicating time of activity is designated by k. Geographical location data is indicated by the letter g. A generalized term for a radio frequeny channel is c. An external activity sensor system is designated by the term AS. A central processor generated command that conveys frequency selection channel assignment information to the remote terminals is designated FS. JCW designates a jammer control word which is a command generated by the processor for operating a jammer terminal. An information signal which indicates a terminal location is designated by TL. A signal indicating the detection of radio frequency activity is designated by S to indicate squelch detection. Tx and Rx clock signals are used to synchronize the transfer of data between the processor and terminals through the order wire subsystems.

TABLE 1 i-Net number
j-Remote terminal unit number within net
k-Time
g-Geographical Location
c-Radio frequency channel
AS-Activity sensor
FS-Frequency slot assignment
JCW-Jammer control word
TL-Terminal location
S-Squelch
Tx Clock-Transmit clock
Rx Clock-Receive clock Central processor 10 generates commands which are sent through the order wire subsystem 12 to the remote terminals. Certain data words are generated by the remote terminals and transmitted through the order wire subsystem to the central processor 10. The remote terminals which operate as communication terminals receive only one command from the central processor 10. This command (FS) selects a radio frequency channel on which the communication terminal will operate. The frequency selection command for channel assignment is generated by the central processor 10 and transferred to a communication terminal by the FS (i, j, c) command word. This command is routed to terminal i, j and commands that terminal to operate on radio frequency channel c. This command is generated by central processor 10 and transferred over line 54 to order wire subsystem 12. Other than selecting the radio frequency operating channel, the operation of the communication terminals is controlled by the local terminal operator.

The remote terminals which operate as jammers are commanded to operate by use of both the FS and JCW commands. The FS command selects the terminal and assigns the frequency on which it will operate. The JCW command specifies a number of operating parameters. These parameters include an on/off pulse rate, an activate/inhibit time interval, a jam on noise mode and, optionally, antenna pointing information. Further information can be included if required. The jammer command word (JCW) is transmitted via line 63 from the central processor 10 to the order wire subsystem 12 where it is then conveyed to the designated jammer terminal.

The synchronizing signals Tx clock and Rx clock are transmitted from the order wire subsystem 12 to the control processor over lines 56 and 58, respectively. Commands and information data words are transferred between the central processor and remote terminals through a time division multiplex loop. The Tx and Rx clock signals insure that the commands and data words are inserted into and received from the multiplex loop at the correct times.

If a remote terminal is set up to monitor a particular channel and report that activity has been detected on that channel, a data word S(i, j, c) is sent from terminal i in net j through the order wire subsystem 12 to central processor 10 to indicate that activity has been detected on channel c. This information is transferred from the order wire subsystem 12 via line 60 to processor 10. Certain types of the remote terminals have the capability of reporting the geographical position thereof by use of the data word TL (i, j). The TL data word is transferred from the order wire subsystem 12 via line 62 to the central processor 10.

Figure 2:
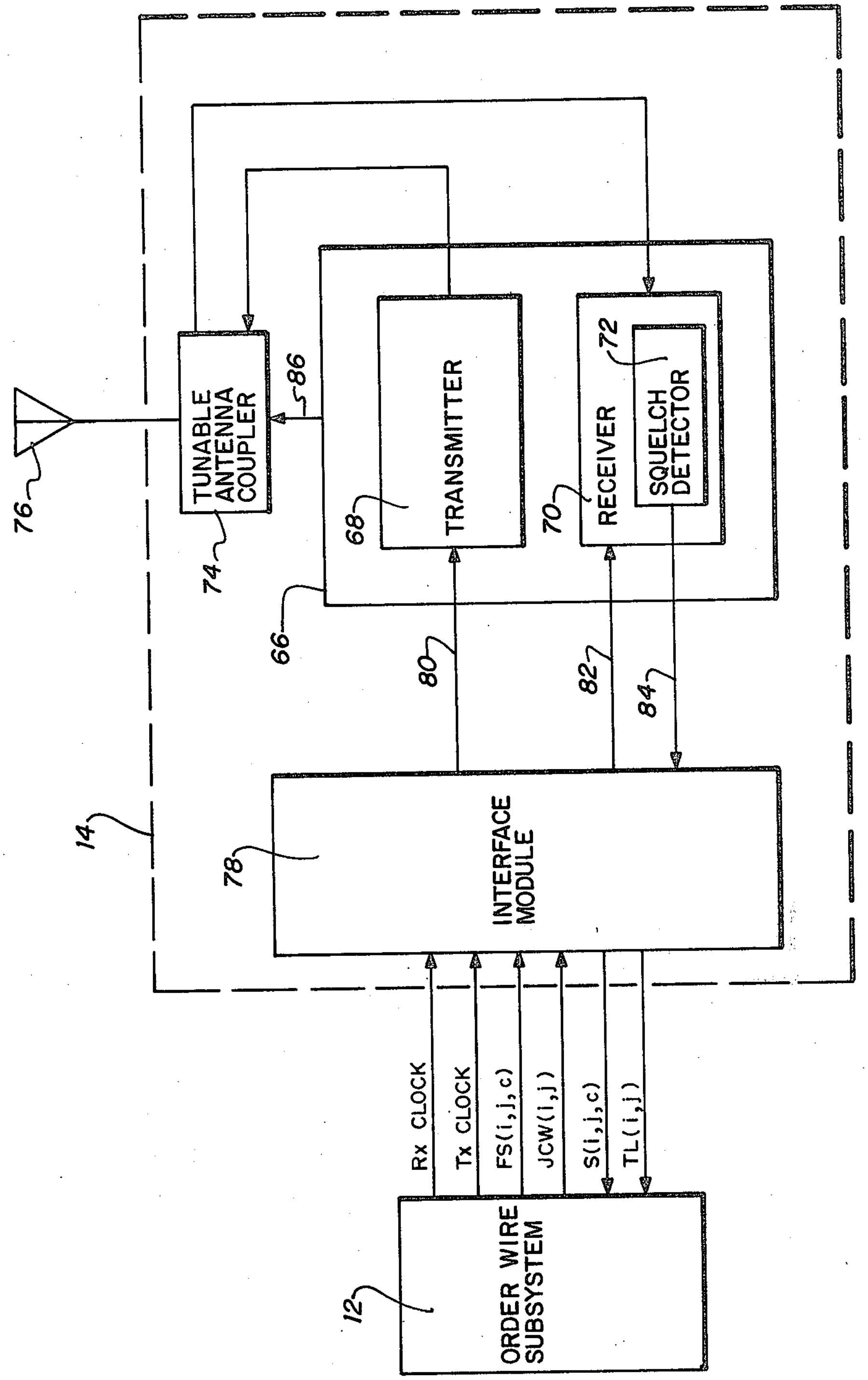
FIG. 2 is a block diagram of a remote terminal as shown in FIG. 1.

A remote terminal, such as terminal 14, is illustrated in greater detail in FIG. 2. Terminal 14 includes a conventional tactical radio 66 which has a transmitter 68 and a receiver 70. (In many cases, these are combined as a transceiver.) Receiver 70 includes a squelch detector circuit 72. Typically, the transmitter, and receiver, of radio 66 are connected through a tunable antenna coupler 74 to an antenna 76. The order wire subsystem 12 which transmits the various commands and data words shown in FIG. 1 is connected to an interface module 78 which is in turn connected to the tactical radio 66. Interface module 78 converts the commands generated by processor 10 and received from order wire subsystem 12 into command signals required to operate radio 66. Module 78 is an adaptable circuit designated to accommodate the particular radio being used. Since a number of different styles and types of tactical radios are in the military inventory, the interface module 78 must be designed in each case to accommodate the radio in the system being used. Radios such as, for example, the models AN/VRC-12 and AN/PRC-77 manufactured by the Memcor Division of E-Systems, Inc., are mechanically tuned and a mechanical interface is required in such instances. However, some tactical radios have (or can be modified to include) electronic tuning and control, and utilize an electronic synthesizer for local signal generation. A radio of this type can be controlled easily by the signals produced by module 78. The interface signals in general comprise transmitter/receiver (transceiver) frequency selection and transmitter on/off commands which are sent over line 80 to transmitter 68. Additional commands are included for tuning the operating frequency of any auxiliary receiver, as well as turning the receiver on and off. The receiver commands are transmitted through line 82. The squelch detector circuit 72 monitors the receive channel for activity and produces an activity data word S(i, j, c) which is transmitted over line 84 to the interface module 78 when radio frequency activity is detected.

Radio 66 also responds to the radio frequency channel commands by tuning antenna coupler 74 by means of a signal transmitted through line 86. For the radios under construction (such as the AN/VRC-12 series of radios), the tuned antenna coupling is an integral part of the radio installation. Antenna 76 must be matched to radio 66 for each selected frequency channel in order to optimize the operation thereof.

Referring to FIGS. 1 and 2, order wire subsystem 12 and sensor communications link 20 are communication links separate and distinct from the communication channels between the various remote terminals. The remote terminals generally operate with voice communications and this is usually carried out at VHF frequencies. Order wire subsystem 12 conveys equipment command and control information and not voice communications. Likewise, only data is carried over sensor communications link 20. It is a feature of the present invention that the order wire subsystem communication channels are separate from the remote terminals' communication channels. To minimize total system costs, the order wire subsystem can be implemented through an existing control/data link such as the PLRS (Position and Location Reporting System) now being developed for the U.S. Army and U.S. Marine Corps, or the JTIDS (Joint Tactical Information Distribution System) being developed for use by all of the military services. Communications channels between the central processor 10 and remote communications terminals 14, 16, 18, etc., are included in the order wire subsystem. The communications elements of the order wire subsystem, as exemplified by JTIDS and PLRS, operate in the UHF spectrum using spread-spectrum techniques. (By contrast, the remote communications terminals operate in the VHF spectrum.) Data transfer between the central processor 10 and the local terminal of the order wire subsystem 12 would take place through hardwired links (if they were available, other communications links could be used instead of hardwires). Similarly the communications channels 86 between the remote communications terminals and the adjacent terminals of the order wire subsystem would be hardwired. The command words or data words which are transferred between the central processor 10 and the remote communications terminals 14, 16, 18, etc., are carried over a time-division multiplex loop wherein each terminal is assigned specific transmit and receive time slots by the order wire subsystem. Thus, addressing for commands and data words is accomplished by transferring the information in the appropriate time slots for delivery to the appropriate units.

The operator display and control console 24 in the preferred embodiment includes a CRT for display of the data received from processor 10. The console further includes a keyboard through which the operator enters commands that are transmitted to processor 10. The data displayed at the console comprises the entries in the various tables while operator commands are input to change or supercede the entries currently in the tables. Although the central processor 10 functions automatically in the process described below the system operator, by use of console 24, can override any of the actions taken by processor 10.

The pseudo-random number generator 30 receives via line 32 a listing of unused channels and selects from among these channels a particular channel to be used by a net. The designation for the channels selected is output on line 34 to processor 10.

External sensor system 22 comprises a plurality of radio receivers which are tuned to the communication spectrum utilized by tactical radios. The sensor radio receivers are carried by platforms such as aircraft, ships or by ground based units. The external sensors transmit through sensor communications link 20 not only the channels having adversary activity but the general area of such activity. This information is conveyed in data word AS (k, g) which is delivered to processor 10. Sensor communications link 20 can be, but is not necessarily, the same system as order wire subsystem 12. Communications link 20, like order wire 12, is a control link independent of the communications channels being used for tactical communications by the remote terminals.

Refer now to FIGS. 1 and 2 for an operational description of the system of the present invention. In a tactical environment the system will be initialized by an operator entering via console 24 the initial communication assignment channels for the remote terminals. In general a single channel will be assigned to each net and the terminals within the net will operate on that channel. This initial assignment information will be stored by processor 10 in table 44. The order wire subsystem terminals which have a location reporting capability, will transmit the location of the adjacent remote communications terminals via order wire subsystem 12 to processor 10 with this information being stored in table 46. The entries in table 46 can likewise be made by the operator working through console 24.

The radio frequency channels being used by adversary parties can be determined by examining a number of sources. If it is suspected that standard frequencies will be used or if covert information is available, the operator can enter this information into processor 10 which will store the information in adversary frequencies table 40. As the external sensor systems such as ground-based systems and aircraft are employed, more information will be collected as to the actual frequency channels and associated locations being utilized by the adversary parties. This information will be transmitted via sensor order wire system 20 to update table 40.

The system of the present invention further has the capability of commanding the remote terminals to operate as passive sensors and monitor particular channels. This is done by generating the FS (i, j, c) and JCW (i, j) commands by processor 10 either automatically or at the command of the operator acting through console 24. These commands operate the remote terminals so as to monitor a selected channel during selected time periods. If activity on the selected channel is detected by the monitoring terminal, a squelch data word S (i, j, c) will be generated by that terminal and transferred via order wire subsystem 12 to central processor 10 where the information is used to update the adversary frequencies table 40. The list of terminals assigned as monitors and the channels to which they are turned is maintained in channel monitor table 48 within processor 10.

As the information on adversary operating frequencies becomes known, processor 10 selects remote terminals which are operated as jammers and are located in the appropriate geographical areas. These terminals are commanded to generate jamming signals on the adversary channels. The parameters of the jamming signal are defined in the jamming control word JCW defined above. The selection of jamming terminals and jamming channels is based on the information in remote terminal location table 46 and adversary frequencies table 40. As the entries in these two tables change, the processor 10 automatically makes adjustments for the terminal assignments and channel selections to appropriately counter the adversary activity. For example, when an adversary begins using a new channel and this activity is detected, processor 10 will immediately assign a jammer, if one is available in the geographical area, to jam the new activity.

Communication channel assignments for the remote terminals are made by processor 10 by using a predetermined list of channels on which the remote terminals can operate. The processor 10 will delete from among these channels any channels that are in use by adversary parties or otherwise active. From the remaining channels the list thereof will be transmitted via line 32 to the uniform probability generator 30 which will pseudo randomly select certain of the channels and these channels will be assigned to the various nets. Channel selection will be made such that there is no interference between the nets. On a recurring basis, either random or periodic, the communication assignments for the remote terminals will be changed by examining the available channels and pseudo randomly making a new selection. This will be carried out on a sufficiently frequent basis to reduce the possibility of enemy jamming or intercept to a low level. It is preferred that the period for using one channel, in a hostile environment, be in the range of a few seconds to a few minutes. This can be viewed as either slow frequency hopping or rapid frequency management. Further frequency changes will be made for the nets automatically when an adversary frequency comes up in conflict with a net channel or an adversary jammer starts operation on an assigned frequency channel. Central processor 10 will automatically generate commands in response to the communication assignment table to maintain the remote terminals operating in accordance with this table. The remote communication terminals shift frequencies at the same time and the frequency change occurs at the end of a time division multiplex frame.

A further operating mode of the present invention is termed "jam on noise squelch". In this mode a remote terminal is commanded to monitor a given channel for activity and if such activity is noted to automatically begin jamming that channel for a selected or random time duration. When this mode is set for a number of terminals in a common geographic area and for a common channel, a self-exciting effect will take place when a first signal is detected. When one terminal starts jamming the channel it will in turn activate the other terminals in the same geographic area causing them to begin jamming the same channel as well. This activity can either be continued for a preselected time or commanded to start or stop by either the processor 10 or the operator acting through console 24. This mode is implemented through the jammer control word (JCW).

Central processor 10 selects the operating frequency for the remote terminals which are used as communication terminals but the operation of the communication terminals in all regards other than frequency selection is carried out by the individual remote terminal communication operators. Frequency changes for all of the communication terminals in a net are carried out at the same time so that there is little disruption of service.

In summary, the system of the present invention provides rapid and automatic frequency changes for communication terminals to reduce the probability of intercept and jamming while at the same time eliminating interference between friendly units. The remote units can be operated as either communication terminals or jammers. The jammers are programmed to jam in response to external sensor data, operator command or in response to channel monitoring. The assignment of communication frequencies is done in a recurring basis either pseudorandomly or periodic.

Although several embodiments of the invention have been illustrated in the accompanying drawings and described in the foregoing Detailed Description, it will be understood that the invention is not limited to the embodiments disclosed, but is capable of numerous rearrangements, modifications and substitutions without departing from the scope of the invention.

I claim:

1. Communication management apparatus for selecting radio frequency channels for use by a plurality of remote communication terminals, comprising in combination:

(a) a central processor for generating radio frequency channel assignment command for said communication terminals, (b) an order wire communication system connected to receive said channel assignment commands from said central processor and transfer said channel assignment command through a communication channel independent of the radio frequency channels used by the communication terminals, and (c) an interface module for each remote communication terminal, said module adapted to receive said channel assignment commands from said order wire communication system and generate control signals to tune at least one of said communication terminals to operate on the radio frequency channel designated by said channel assignment command.

2. Apparatus as recited in claim 1 further including means connected with said central processor for changing the radio frequency channel assignments for said communication terminals on a recurring basis.

3. Apparatus as recited in claim 2 further including means for selecting said radio frequency channel assignments on a pseudorandom basis.

4. Apparatus as recited in claim 1 further including an external sensor system for monitoring at least one of said radio frequency channels and generating an activity signal when radio frequency activity is detected on a channel and means for communicating said activity signal to said central processor.

5. Communication management apparatus for controlling the radio frequency operating channels used by a plurality of remote communication terminals, comprising:

(a) a central processor for maintaining a communication assignment table in which each remote terminal is assigned one of the operating channels,
(b) means for generating channel assignment commands in accordance with said communication assignment table,
(c) an order wire communication system connected to receive said channel assignment commands from said means for generating,
(d) an interface module located at and connected with each of the remote communication terminals for receiving said channel assignment commands from said order wire communication system and generating therefrom control signals to cause the remote communication terminal to operate on the channel assigned to that terminal in said communication assignment table, and
(e) means for revising said communication assignment table on a recurring basis to change the channel assignments for the communication terminals.

6. Apparatus as recited in claim 5 wherein said terminals are grouped into a plurality of nets and the terminals within each net are commanded to operate on the same communication channel.

7. Apparatus as recited in claim 5 further including an operator console connected to said central processor for entering communication assignments into said communication assignment table.

8. Apparatus as recited in claim 5 wherein said means for revising includes means for pseudorandomly selecting said channel assignments for the terminals.

9. Apparatus as recited in claim 5 further incorporating external sensor means which monitor the remote communication channels and report activity thereon to said central processor.

10. Communication management apparatus for controlling the radio frequency operating channels used by a plurality of remote communication terminals and radio frequency jammers comprising:
(a) a central processor for maintaining a plurality of tables including,
 (i) a communication assignment table in which each of the remote terminals is assigned one of the operating channels,
 (ii) a jamming assignment table in which each of the jammers is assigned one of the operating channels,
 (iii) an adversary frequencies table which lists the operating channels in use by adversary parties,
(b) means associated with said central processor for generating channel assignment commands for said remote communication terminals in accordance with said communications assignment table and for said jammers in accordance with said jamming assignment table,
(c) an order wire communication system connecting said central processor to each of the remote communication terminals and jammers for conveying said commands from said central processor to said remote communication terminals and jammers,
(d) sensor means for monitoring selected communication channels and reporting activity thereon to said central processor to update said adversary frequencies table,
(e) means associated with said central processor for generating the entries for said communications assignment table by assigning to each remote communication terminal a channel selected from a predetermined set less the channels included in said adversary frequencies table,
(f) means associated with said central processor for generating the entries for said jamming assignment table by assigning the channels listed in said adversary frequencies table to selected ones of the jammers,
(g) means incorporated with each remote communication terminal and each jammer for receiving said channel commands and generating control signals to operate each remote communication terminal and jammer in accordance with the channel command directed to each terminal and jammer, and
(h) means associated with said central processor for revising said channel assignment table on a recurring basis to change the channel assignments for the remote communication terminals.

11. Apparatus as recited in claim 10 further including an operator console connected to said central processor for displaying the information in said tables, entering data into said tables and entering operational commands for transmission to the remote communication terminals and jammers.

12. Apparatus as recited in claim 10 wherein said means for revising includes means for pseudorandomly selecting said channel assignments for the terminals.

13. Apparatus as recited in claim 10 wherein:
(a) said adversary frequencies table includes a geographical location entry defining the geographical location of activity for each channel in the adversary frequencies table, and
(b) further including a terminal and jammer location table defining the geographical location for each of the remote communication terminals and jammers.

14. Apparatus as recited in claim 13 wherein said means for generating channel assignment commands utilizes the location information in said adversary frequencies table and said remote communication terminal and jammer location table for assigning adversary channels to the jammers located in the region of activity of adversary channels.

15. Apparatus as recited in claim 10 further including a communication system which connects said sensor means to said central processor.

16. Apparatus as recited in claim 10
(a) wherein said central processor maintains a channel monitor table which relates selected remote terminals with selected channels for monitoring the activity on the selected channels,
(b) including means associated with said central processor for generating operational commands in accordance with said channel monitor table to operate the remote terminals specified therein in a receive mode to monitor the channels designated therein, and
(c) including means associated with said remote terminals for reporting radio frequency activity to said central processor via said order wire communication system when the remote terminals are operating in a receive mode to monitor channel activity.

17. A method for assigning radio frequency communication channels to remote terminals in a communications network comprising the steps of:
(a) maintaining a communication channel assignment table in a central processor for relating each of the remote terminals to a selected channel, (b) transmitting commands from said central processor via an order wire communications link to each of the remote terminals for commanding the terminals to operate on the communications channel assigned to the terminal according to said communication channel assignment table, and (c) revising said communication channel assignment table on a recurring basis to change the communication channel assignments for the terminals.

18. The method according to claim 17 further including the step of grouping the remote terminals into a plurality of nets and assigning the same channel to each of the terminals within a given net.

19. The method according to claim 17 further including the step of displaying the entries in said communications channel assignment table at an operator console and receiving commands from said console for changing entries in said communications channel assignment table.

20. The method according to claim 17 further including the step of monitoring said communication channels and reporting activity thereon to said central processor.

21. The method according to claim 17 wherein the step of revising said communication channel assignment table comprises the step of pseudorandomly selecting the channel assignments for the remote terminals on a recurring basis.

22. A method for operating a network of communication terminals and jammers to assign radio frequency channels thereto, comprising the steps of:

(a) maintaining in a central processor a communication channel assignment table that relates each of the terminals to a selected communication channel, (b) maintaining in said central processor a jamming assignment table that relates each of the jammers to a selected communication channel, (c) maintaining in said central processor an adversary frequencies table that lists the communication channels in use by adversary parties, (d) monitoring said communication channels and reporting activity thereon to said central processor for updating said adversary frequencies table, (e) generating entries for said communication assignment table by selecting from channels in a preselected group excluding the channels listed in said adversary frequencies table, (f) generating entries for said jamming assignment table by assigning the jammers to the channels listed in said adversary frequencies table, (g) generating operational commands to assign the terminals to operate on the channels specified in said communication channel assignment table, (h) generating operational commands to assign the jammers to operate on the channels specified in the jamming assignment table, (i) transmitting said operational commands from said central processor to the communication terminals and jammers via an order wire communications link, and (j) revising said communication assignment table on a recurring basis to change the channel assignments for said terminals.

23. The method according to claim 22 further including the steps of displaying selected entries of said tables on an operator console and entering entries for said tables from said console to said central processor.

24. The method according to claim 22 wherein the step of revising comprises pseudorandomly selecting the channel assignments for the terminals on a recurring basis.

25. The method according to claim 22 further including the steps of grouping the terminals into a plurality of nets and assigning the same channel to each of the terminals within a given net.

26. The method according to claim 22 further including the steps of:

(a) maintaining in said adversary frequencies table a geographical location entry defining the geographical location of activity for each channel in said adversary frequencies table, (b) maintaining a communication terminal and jammer location table defining the geographical location of each communication terminal and jammer, and (c) generating the operational commands for assigning channels to the jammers utilizing the location information in the adversary frequencies table and the communication terminal and jammer location table for assigning adversary channels to the jammers located in the region of activity of the adversary channels.

27. The method according to claim 22 wherein the step of monitoring and reporting activity on the communication channels comprises transmitting activity information from a remote monitor via a sensor communications link to said central processor.

* * * * *